United States Patent [19]
Hernandez et al.

[11] Patent Number: 5,685,468
[45] Date of Patent: Nov. 11, 1997

[54] PORTABLE EXTERNAL TOOL TRAY ASSEMBLY

[76] Inventors: Juan M. Hernandez; Maria Z. Hernandez, both of 918 Grosvenor, San Antonio, Tex. 78221

[21] Appl. No.: 455,259

[22] Filed: May 31, 1995

[51] Int. Cl.⁶ .............................. B60R 9/00; B60R 11/00
[52] U.S. Cl. ...................... 224/492; 224/281; 224/282; 224/488; 224/495; 224/497; 224/498; 224/524; 108/44
[58] Field of Search ...................... 224/275, 310, 224/314, 320, 321, 322, 281, 282, 403, 404, 488, 492, 495, 497, 498, 499, 500, 511–514, 523, 524, 545, 548, 549, 553, 564; 108/8, 44, 45, 46, 47, 134, 135, 137; 296/37.13, 37.16; D6/431; D12/425, 426

[56] References Cited

U.S. PATENT DOCUMENTS

| | | | |
|---|---|---|---|
| D. 343,601 | 1/1994 | Brady | D12/425 |
| 1,723,238 | 8/1929 | Hoot | 224/500 |
| 2,499,103 | 2/1950 | Love | 224/549 |
| 2,825,611 | 3/1958 | Aynesworth | 224/564 |
| 3,080,832 | 3/1963 | Schroemges | 108/134 |
| 3,606,112 | 9/1971 | Cheshier | 224/564 |
| 4,830,243 | 5/1989 | Mann | 224/553 |
| 4,858,796 | 8/1989 | Roth | 224/553 |
| 5,170,810 | 12/1992 | Chapin | 224/281 |

*Primary Examiner*—Henry J. Recla
*Assistant Examiner*—Timothy L. Maust
*Attorney, Agent, or Firm*—Gunn, Lee & Miller, P.C.

[57] ABSTRACT

An adjustable, portable tool tray assembly for external mounting on a motor vehicle. The tool tray assembly has an open tray compartment, a means for removable engagement with the motor vehicle which extends from the tray and a slidably adjustable, hinged brace for positioning the tool tray assembly on numerous locations on the motor vehicle. The tray may be composed of two tray components which may be adjusted with respect to each other to vary the size of the open tray compartment.

11 Claims, 7 Drawing Sheets

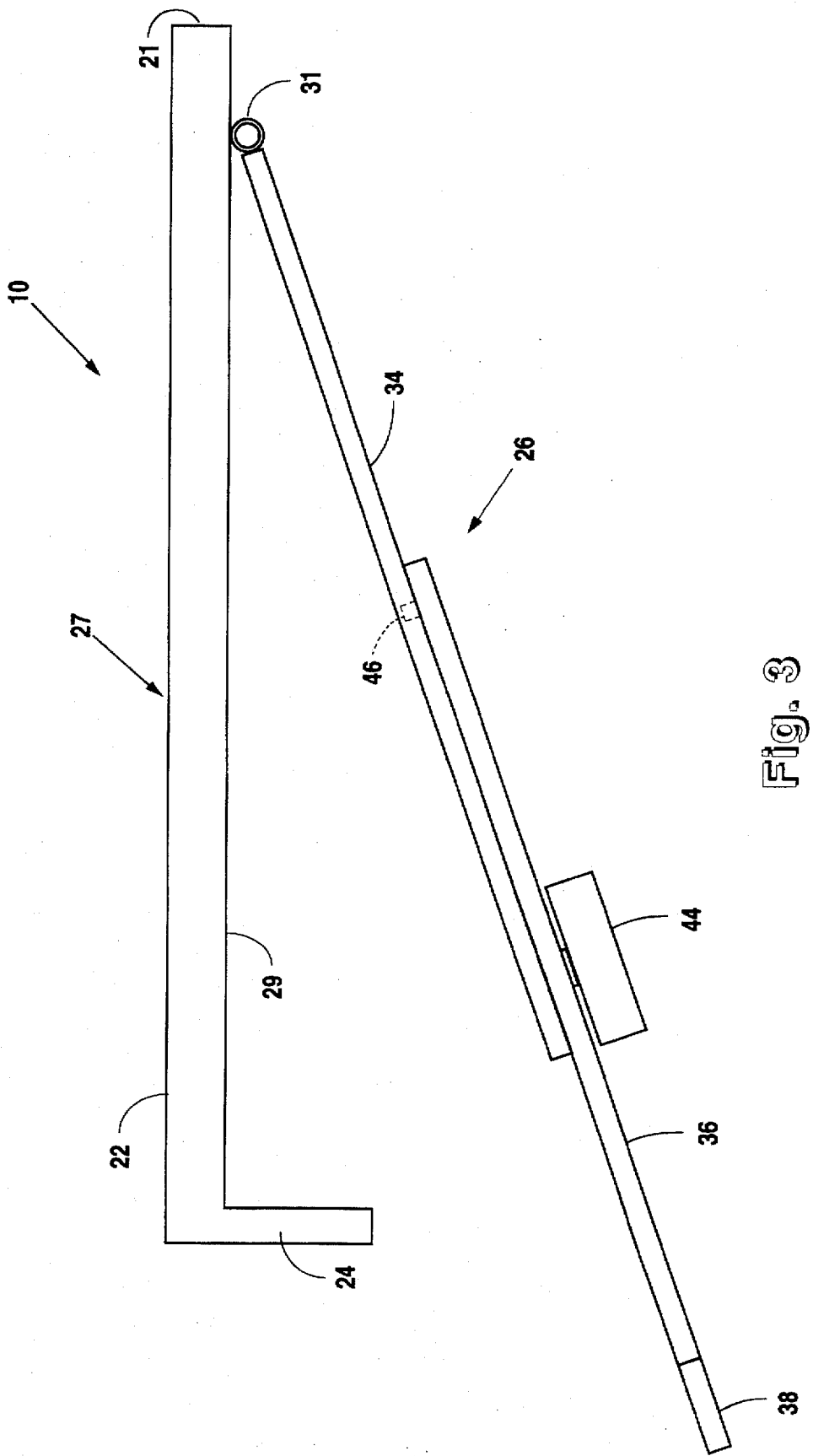

PORTABLE EXTERNAL TOOL TRAY ASSEMBLY

BACKGROUND OF THE INVENTION

1. Field of The Invention

Applicant's invention relates to a portable, adjustable tool tray assembly for use in motor vehicle repairs. The tool tray assembly is designed for mounting externally from the motor vehicle by engaging one end of the tool tray assembly on the motor vehicle at a support position with an edge structure; such as, the ledge in front of the engine compartment, one of the side edges of the engine compartment, a front fender, a door, a window, the trunk, a side wall of a truck bed, and a hatch back door; and positioning a hinged brace of the tool tray assembly against the motor vehicle at another support position having a horizontally extending structure and leveling the tool tray assembly with the adjustable hinged brace.

2. Background Information

Standard tool boxes with lift-out trays with internal compartment and a closing, locking lid are well known in the art. These types of tool boxes are heavy to carry around and when a user is working on a motor vehicle, the tool box can be placed next to the motor vehicle on the ground. The user must then bend down and select the appropriate tools which he will use and return them after use. Most users; however, lay the selected tools on some portion of the motor vehicle; i.e., the fender or some engine component, for easy access while working. This method generally results in tools falling into the engine or on the ground.

In an effort to make the user's tools more accessible, tool trays were designed, which attached or rested on a portion of the motor vehicle. For example, U.S. Pat. No. 2,901,303 discloses a mechanic's tray arrangement which can only be mounted at the front of the engine compartment and held on the vehicle by attachment to the hood-locking mechanism located adjacent to the front of the engine compartment. This tray arrangement has a pair of adjustable supporting legs which rest on top of the grill and must be separately set to a level position. However, as noted in U.S. Pat. No. 3,015,530, this type of tray arrangement became obsolete because in modern motor vehicles, the locking assembly is attached to the hood and the cooperating striker stud mechanism is located where the lock assembly was formerly located in a position adjacent to the engine compartment. The mechanic's tray arrangement disclosed in U.S. Pat. No. 3,015,530 was adapted to overcome this change by including a lock assembly for receiving the fixed striker stud, in addition to the tray and the pair of side supporting legs. This lock assembly is connected to the underside of the tray by a post. The pair of side legs are bolted to the sides of the tray and angled forward and engage a portion of the frame of the motor vehicle. The legs contain a number of spaced apertures allowing adjustment by removing the bolts from set of corresponding apertures and engaging another set. This adjustment must be made prior to attaching the tray to the motor vehicle.

More recently adjustable length tool trays which extend across the engine compartment of a motor vehicle are known in the prior art. U.S. Pat. No. 5,160,026 discloses a compartmented tool tray which slidably fits within a casing. The tool tray is adjusted by sliding the tray beyond the casing to a distance so that one end of the box fits on the cowling at the rear end of the engine compartment and the other end fits the ledge at the front end of the engine compartment.

Another example of a tool tray assembly that is designed to fit across the engine compartment and be supported on the opposed edges is disclosed in U.S. Pat. No. 5,331,904. This tool tray includes a center work table section and two support members which slide within the center section and which can be locked into position at any desired position to accommodate different sized engine compartments. Standard sized tool trays fit within the two support members for the storage of small tools and parts.

None of the prior art tool tray assemblies provide an easily adjustable, portable tool tray assembly as is disclosed in the present invention, which can be mounted at virtually any location on a motor vehicle having an edge structure to which the tool tray assembly of the present invention can be engaged and a stable horizontally extending structure of the motor vehicle directly below the edge structure against which the tool tray assembly can be braced. The adjustable hinged brace provides easy adjustment and leveling capabilities. Additionally, none of the prior art tool tray assemblies provide a tool tray compartment which can easily be adjusted in size by the user to accommodate any size tools.

SUMMARY OF THE INVENTION

Accordingly, it is an object of the present invention to provide a versatile, portable tool tray assembly for external mounting at a number of different locations on a motor vehicle.

It is an additional object of the present invention to provide an adjustable tool tray assembly which can be easily leveled at the mounting location by adjusting the length of the hinged brace and locking it into position.

It is a further object of the present invention to provide an adjustable tool tray assembly which can be removed from one location on the motor vehicle while still holding tools and engaged at another location on the motor vehicle without removing the tools.

It is an additional object of the present invention to provide an adjustable tool tray assembly in which the size of the tool tray compartment can be adjusted.

In satisfaction of these and other objects, the present invention provides an adjustable, portable tool tray assembly having a tray forming an open compartment; a means for removable engagement of the tool tray assembly with a motor vehicle, which extends downwardly from and perpendicularly to the lower surface of the tray, and a hinged brace for positioning and leveling the tool tray assembly on the motor vehicle at a horizontally extending structure. In an alternate embodiment, the open tray compartment is composed of two tray components which may be adjusted with respect to each other to vary the size of the open tray compartment.

The present invention provides an adjustable, portable tool tray assembly which is an improvement over prior art tool tray assemblies in that the design allows the tool tray assembly to be mounted at a number of different locations on a motor vehicle and on many different models of motor vehicles. It is not necessary to attach the tool tray assembly of the present invention to a specific location on the motor vehicle; such as, the hood locking mechanism or the cooperating striker stud mechanism as in some of the prior art. Nor is it necessary to place the tool tray assembly in the engine compartment where it may be in the way if the engine must be run during repair work. The tool tray assembly of the present invention can be attached to the front of the engine compartment, the side of the engine compartment, a window, the front section of the trunk, the side walls of a truck bed, and several other locations. Further, the hinged brace allows easy adjustment to fit any Location on a motor vehicle and allows easy leveling of the tray compartment. Additionally, the tool tray assembly can be removed from its original mounted location while still holding tools and remounted at a different location on the motor vehicle.

Further, in an alternate embodiment of the present invention, the size of the tool tray can be adjusted to accommodate larger size tools or more tools.

BRIEF DESCRIPTION OF THE DRAWINGS

FIG. 3 is a side view of the preferred tool tray assembly of the present invention.

DETAILED DESCRIPTION OF THE PREFERRED EMBODIMENT

Figure 1:
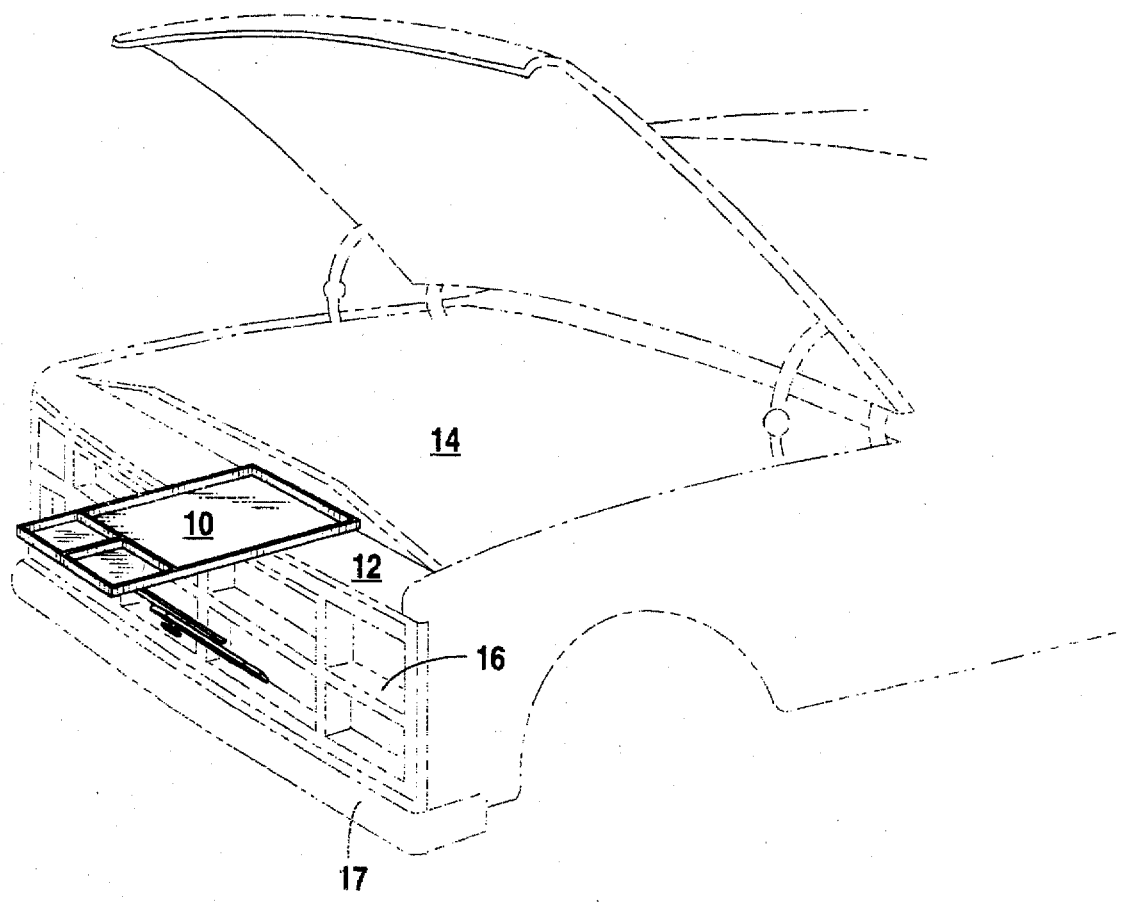
FIG. 1 is a schematic perspective view showing the tool tray assembly of the present invention mounted in a typical position on a motor vehicle.

The present invention will now be described in detail with specific reference to FIGS. 1-7, which are examples of the preferred and alternate embodiments of the present invention. While the invention will be described in detail in conjunction with these embodiments, it will be understood that they are not intended to limit the invention to those embodiments.

As depicted in FIGS. 1-6, the tool tray assembly (10) of the present invention is for use in conjunction with a motor vehicle wherein the tool tray assembly is supported by, and extends externally away from the motor vehicle. In this preferred use of the tool tray assembly (10), the tool tray assembly (10) is supported at two positions on the motor vehicle, the ledge (12) adjacent to the front of the engine compartment (14) and against a portion of the grill (16) but it could also engage the top edge of the front bumper (17) of the motor vehicle. However, the tool tray assembly can be mounted at any location on the motor vehicle which has an edge structure to which the tool tray assembly (10) can be engaged and a stable horizontally extending structure of the motor vehicle directly below the edge structure against which the tool tray assembly (10) can be braced.

FIGS. 2-6 provide a more detailed view of the tool tray assembly (10) of the present invention. The tool tray assembly (10) includes three basic elements: a tray (22), a means (24) for removable engagement with the motor vehicle and a hinged brace (26).

Figure 2:
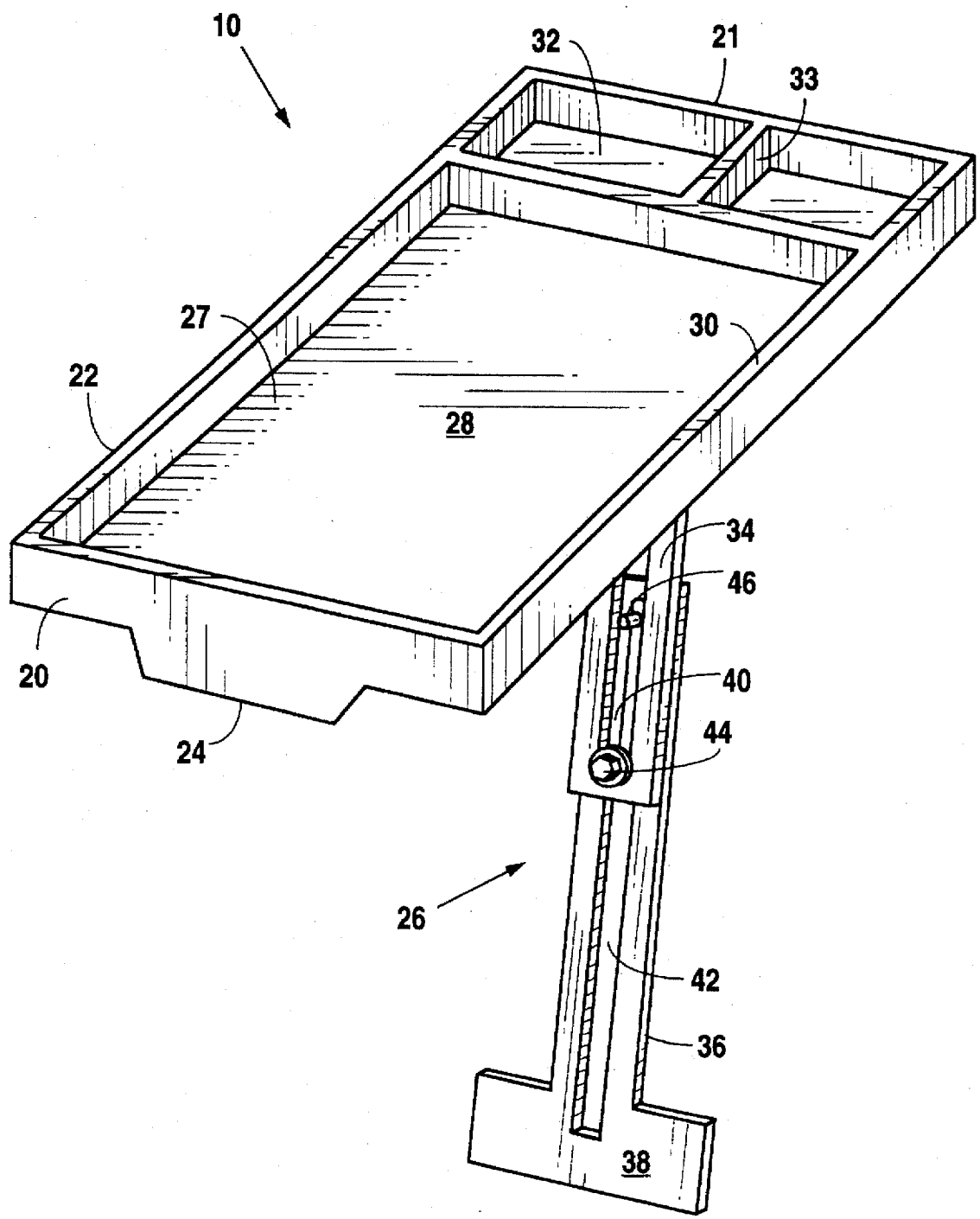
FIG. 2 is a perspective view of the preferred tool tray assembly of the present invention.
Figure 4A:
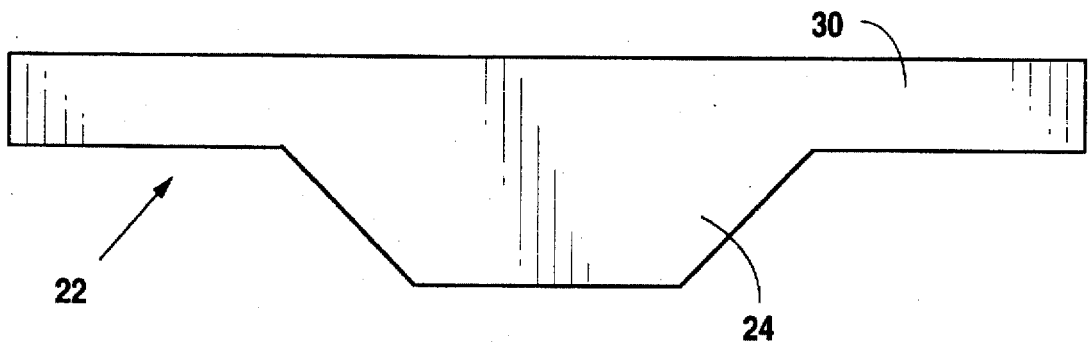
FIG. 4A is a front view of the preferred tool tray assembly of the present invention.
Figure 4B:
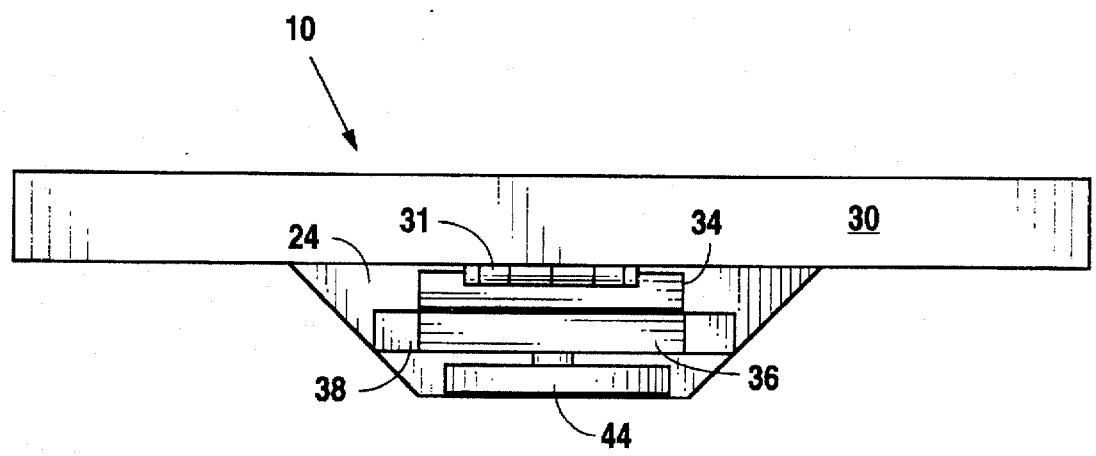
FIG. 4B is a back view of the preferred tool tray assembly of the present invention.
Figure 5:
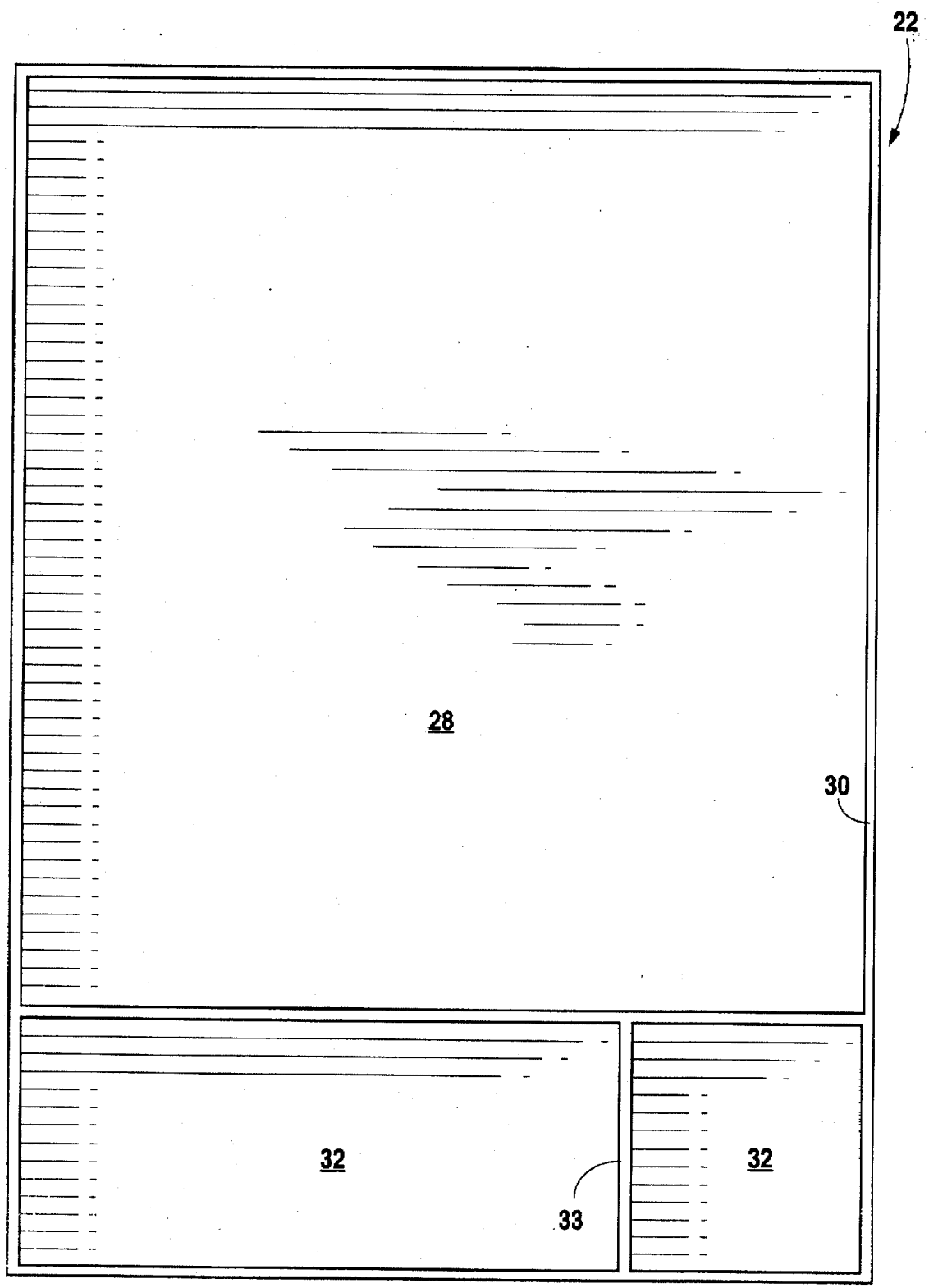
FIG. 5 is top view of the preferred tool tray assembly of the present invention.
Figure 6:
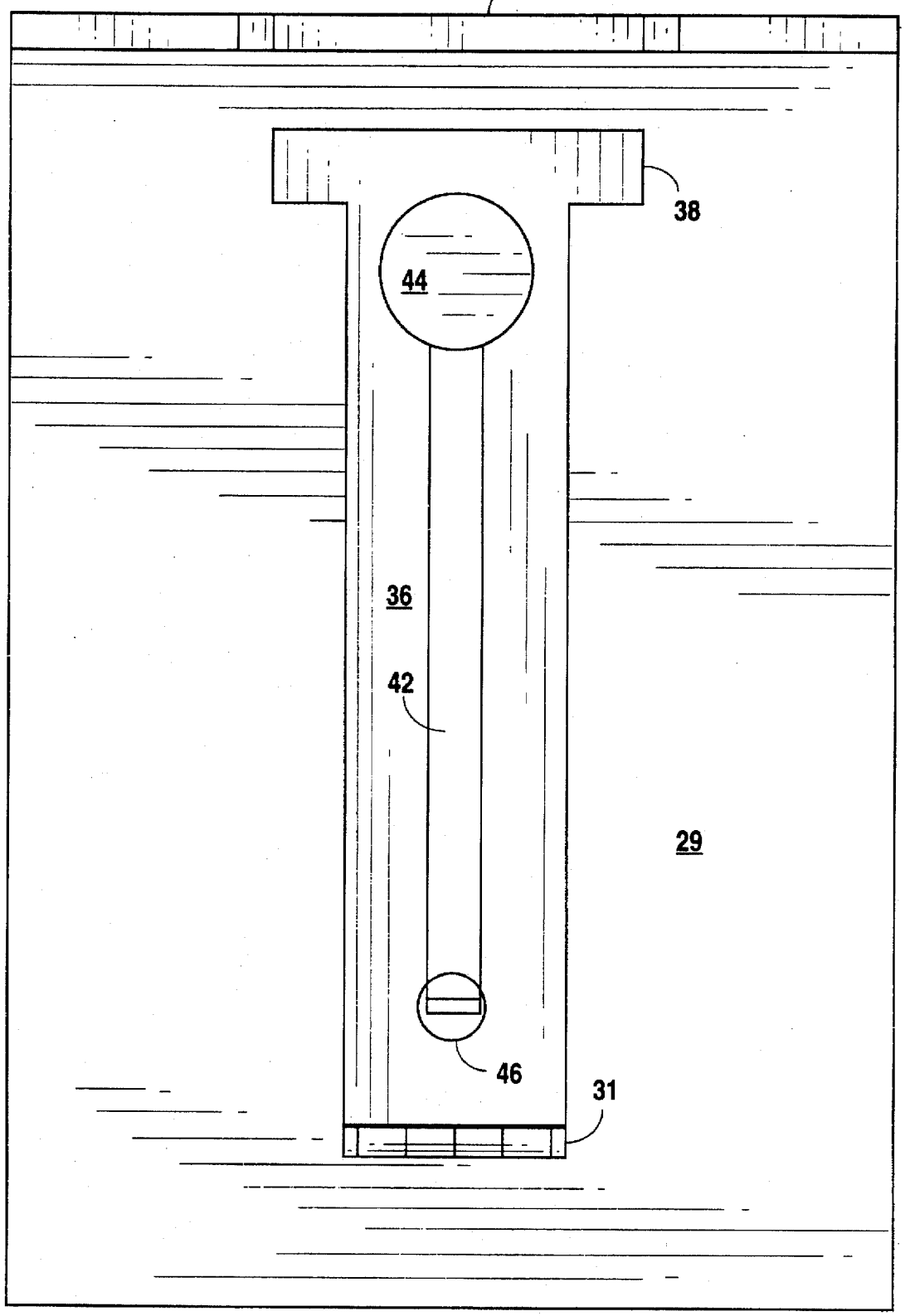
FIG. 6 is a bottom view of the preferred tool tray assembly of the present invention.

The tray (22) has a generally planar surface with an upper surface (28) and a lower surface (29) forming an open compartment (27). The tray further contains a raised lip (30) extending perpendicularly upwardly from the planar upper surface (28) and along the perimeter of the tray (22). The tray (22) is generally rectangular and has a first end (20) and a second end (21). The tray also contains at least one internal compartment (32) but may contain more than one internal compartment (32), as shown in FIG. 2, to hold small parts, such as screws and bolts. The internal compartments (32) are divided by raised separators (33).

The means (24) removably engages the motor vehicle at an edge structure; such as the ledge (12) of the engine compartment and extends downwardly from and perpendicularly to the lower surface (29) of the tray (22). In the preferred embodiment, the means (24) is an extension of the first end (20) of the tray (22). The shape of the means (24) can be generally rectangular with angled sides, rectangular or square-shaped. The engagement means (24) can be any shape as long as it is capable of engaging an edge structure on a motor vehicle.

The hinged brace (26) engages the motor vehicle at a horizontally extending structure of a motor vehicle and the brace is slidably adjustable during engagement with the motor vehicle to attain proper positioning and proper leveling of the tray (22).

The hinged brace (26) comprises a first leg (34) slidably connected to a second leg (36), allowing the length of the hinged brace (26) to be adjusted. The first leg (34) is attached to the lower surface (29) at or near the second end (21) of the tray (22) by a hinge (31) and the second leg (36) of the hinged brace (26) has a T-shaped extension (38). Preferably, the hinged brace (26) is attached to the lower surface (29) of the tray (22) within one inch of the second end (21). However, the hinged brace (26) can be attached at any location near the second end (21) as long as the location allows the tool tray assembly (10) to be stably positioned and leveled on the motor vehicle. The first leg (34) contains a longitudinally extending open channel (40) and the second leg (36) also contains a longitudinally extending open channel (42). A means for holding the open channel (40) of the first leg (34) and the open channel (42) of the second leg (36) in alignment is referred to an alignment means. A perpendicularly extending fastener (44) captively slides within the open channel (40) of the first leg (34) and the open channel (42) of the second leg (36), and is capable of alternatively allowing sliding and locking the first leg (34) with respect to the second leg (36).

In FIG. 2, the alignment means is a guide pin (46) attached to the second leg (36) and extending through both of the open channels (40) and (42) of the first (34) and second (36) legs. The guide pin (46) may be extended in length to pass completely through the width of the open channel (40) of the first leg (34) and extending beyond the open channel (40); then a cap, nut or bolt can be attached at the extending end of the guide pin (46), if necessary to maintain the proximity of the first (34) and second (36) legs when the hinged brace is engaged on the motor vehicle. When the cap is attached to the guide pin (46), it would still allow the first (34) and second (36) legs to easily slide against one another.

Figure 7:
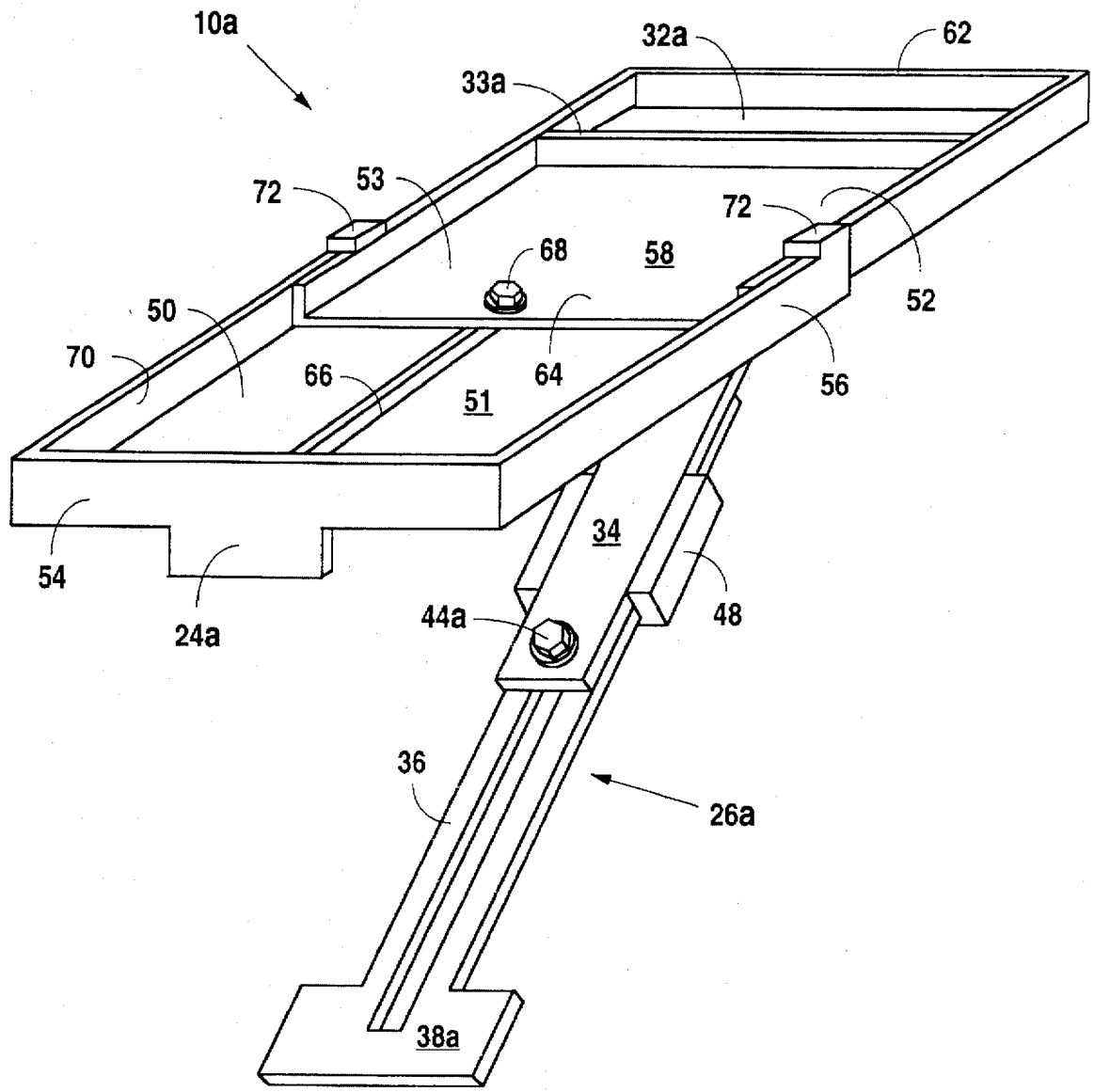
FIG. 7 is a perspective view of alternate embodiment of the tool tray assembly of the present invention.

In an alternate embodiment shown in FIG. 7, the alignment means is a sleeve (48) which can be part of the first leg (34) or part of the second leg (36). If the sleeve (48) is part of the first leg (34) then the second leg (36) will slide through the sleeve (48) which keeps the open channel (40) on the first leg (34) aligned with the open channel (42) on the second leg (36). If the sleeve (48) is part of the second leg (36) then the first leg (34) will slide through the sleeve (48) which keeps the open channel (40) on the first leg (34) aligned with the open channel (42) on the second leg (36). In FIG. 7, the sleeve (48) is attached to the first leg (34) and the first leg additionally has a fastener (44a) which passes through both open channels (40) and (42) and the sleeve (48). When the desired length of the hinged brace (26a) is selected, the first (34) and second (36) legs are locked in position by tightening the fastener (44a) and locking the legs (34) and (36) in position. Although the sleeve (48) is shown with the alternate embodiment of the present invention, either of the alignment means, the guide pin (46) or the sleeve (48), can be utilized with either of the embodiments, (10) and (10a) of the present invention.

The tool tray assembly (10a) is composed of a first tray component (50), a second tray component (52) and a hinged adjustable brace (26a). The second tray component (52) slides over the first tray component (50), and together components (50) and (52) form a single open adjustable size tray compartment (53), which can be adjusted to any size up to approximately 24 inches in length when fully extended.

More specifically, the tool tray assembly (10a) comprises a first tray component (50) having a generally planar surface with an upper surface (51) and a lower surface (not shown). The first tray component (50) further has a first end (54) and a second end (56) and a means (24a) for removably engaging the motor vehicle at a first support position having an edge structure, such as the ledge (12) adjacent to the front of the engine compartment (14). The first end (54) of the first tray component (50) is the end which is distal to the second tray component (52) and the second end (56) of the first tray component (50) is the end which is proximal to the second tray component (52). In the preferred embodiment, the means (24a) is an extension of the first end (54) of the first tray component (50). The shape of the means (24a) can be generally rectangular with angled sides, rectangular or square-shaped. The engagement means (24a) can be any shape as long as it is capable of engaging an edge structure on a motor vehicle. The means (24a) extends perpendicularly from the lower surface (not shown) of the first end (54) of the first tray component (50).

The second tray component (52) also has a generally planar surface with an upper surface (58) and a lower surface (not shown), has a generally rectangular shape, is parallel to and is slidably connected to the first tray component (50). The second tray component (52) further has a first end (62) and a second end (64). The first end (62) of the second tray component (52) is the end which is distal to the first tray component (50) and the second end (64) of the second tray component (52) is the end which is proximal to the first tray component (50). As discussed above, the first tray component (50) together with the second tray component (52) form a single open tray compartment (53).

The first tray component (50) of the tool tray assembly (10a) additionally includes a longitudinally extending open channel (66). The second tray component (52) is slidably connected to the first tray component (50) by a perpendicularly extending fastener (68), which captively slides within the open channel (66) of the first tray component (50). The fastener (68) is capable of alternatively allowing sliding and locking of the second tray component (52) with respect to the first tray component (50). Although the combination of the open channel (66) and the fastener (68) is a preferred manner of slidably connecting the first tray component (50) and the second tray component (52), other combinations of means which allows the two tray components to slide over one another and be locked in position is to be encompassed by the present invention.

The hinged brace (26a) of the tool tray assembly (10a) is attached to the lower surface (not shown) at or near the first end (62) of the second tray component (52) by a hinge (not shown). The hinged brace (26a) shown in FIG. 7 is generally the same as the hinged brace (26) in FIG. 2 except that the hinged brace (26a) is depicted as utilizing a sleeve (48) as the alignment means rather than the guide pin (46) as depicted in (10) shown in FIG. 2. Both of the hinged braces (26) and (26a) are used for positioning the tool tray assemblies (10) and (10a) on motor vehicles in the same way.

The tool tray assembly (10a) has an open tray compartment (53), which is formed by the slidable cooperation of the first tray component (50) and the second tray component (52), and further comprises a raised lip (70) extending perpendicularly upwardly from each of the planar surfaces (51) and (58) and along a portion of the perimeter of the first tray component (50) and the second tray component (52). The raised lip (70) can only be present on three sides of the first (50) and second (52) tray components so that the second tray component (52) can slide over and is able to nest within the first tray component (50) as the size of the open tray compartment (53) is adjusted in size.

The raised lip (70) of the first tray component (50) of the tool tray assembly (10a) can further comprise guide members (72) to facilitate the retention of the second tray component (52) in a nesting position over the first tray component (50).

The second tray component (52) of the tool tray assembly (10) can additionally contain at least one internal compartment (32a) divided by raised separators (33a) and may contain several such compartments (32a) to hold small parts, such as screws and bolts.

To use either of the tool tray assemblies (10) or (10a) disclosed in the present invention, the user, now referring to the attachment of the tool tray assembly (10) as shown in FIG. 2, simply attaches the means (24) for removable engagement to an edge structure of a motor vehicle and then slidably adjusts the hinged brace (26) to position and level the tray (22). The brace (26) is adjusted by loosening the fastener (44) to allow the sliding of the first leg (34) over the second leg (36) until the proper position is found for bracing the tool tray assembly (10) against the motor vehicle. Then the fastener (44) is tightened to lock the brace (26) into position. The tool tray assembly (10) is then ready for use.

If tool tray assembly (10a) is utilized, then the size of the open compartment (53) can be adjusted by loosening the fastener (68) and sliding the second tray component (52) over the first tray component (50) until the desired size is obtained and then the fastener (68) is tightened.

The foregoing description of the preferred embodiments of the present invention was presented for illustrative purposes and not meant to limit the invention to specific forms disclosed because various modifications to the disclosed invention are possible in light of the above teachings. The invention is intended to cover alternatives, modifications and equivalents, which may be included within the spirit and scope of the invention as defined by the appended claims.

We claim:

1. An adjustable, portable tool tray assembly for use in conjunction with a motor vehicle, wherein said tool tray assembly is supported by, and extends externally away from, said motor vehicle, said tool tray assembly comprising:

a tray having a first tray component having a generally planar surface and a second tray component, slidably connected to said first tray component, said second tray component having a generally planar surface parallel to said first tray component, and said second tray component and said first tray component together forming a single open tray compartment;

a single point means for removable engagement with said motor vehicle at an edge structure of said motor vehicle, said means for removable engagement extending from said tray;

a hinged brace attached to said tray for positioning and for leveling said tool tray assembly on said motor vehicle, said brace engaging said motor vehicle at a horizontally extending structure of said motor vehicle, and said brace being slidably adjustable during engagement with said motor vehicle to attain proper positioning and proper leveling; and wherein said first tray component further comprises a longitudinally extending open channel, and said second tray component further comprises a perpendicularly extending fastener captively sliding within said open channel of said first tray component, said fastener being capable of alternatively allowing sliding and locking of said second tray component with respect to said first tray component.

2. The portable tool tray assembly of claim 1, wherein said hinged brace further comprises a T-shaped extension for said positioning on said motor vehicle.

3. The portable tool tray assembly of claim 1, wherein said hinged brace comprises a first leg slidably connected to a second leg allowing the length of said hinged brace to be adjusted, said first leg being attached to said second tray component and said second leg of said hinged brace having a T-shaped extension.

4. The portable tool tray assembly of claim 1, wherein said second tray component further comprises at least one internal compartment divided by raised separators.

5. The portable tool tray assembly of claim 3, wherein said first and said second legs further comprise a longitudinally extending open channel present within each of said first and said second legs, a means for holding said open channels of said first and said second legs in alignment, and a perpendicularly extending fastener captively sliding within said open channel of said first and said second legs, said fastener being capable of alternatively allowing sliding and locking of said first leg with respect to said second leg.

6. The portable tool tray assembly of claim 5, wherein said alignment means is attached to said second leg and extends through said open channels of said first and said second legs.

7. The portable tool tray assembly of claim 5, said first leg further comprises a sleeve as said alignment means through which said second leg slides comprises a sleeve as said alignment means through which said first.

8. The portable tool tray assembly of claim 5, said second leg further comprises a sleeve as said alignment means through which said first leg slides.

9. An adjustable portable tool tray assembly for use in conjunction with a motor vehicle, wherein said tool tray assembly is supported by, and extends externally away from, said motor vehicle, said tool tray assembly comprising:

a first tray component having a generally planar surface, a single point means for removable engagement with said motor vehicle at an edge structure of said motor vehicle, and a longitudinally extending open channel;

a second tray component, slidably connected to said first tray component, said second tray component having a generally planar surface parallel to said first tray component and a perpendicularly extending fastener captively sliding within said open channel of said first tray component, said second tray component and said first tray component together forming a single open tray compartment, said fastener being capable of alternatively allowing sliding and locking of said second tray component with respect to said first tray component; and a hinged brace attached to said second tray component for positioning and for leveling said tool tray assembly on said motor vehicle, said brace engaging said motor vehicle at a horizontally extending structure of said motor vehicle, and said brace being slidably adjustable during engagement with said motor vehicle to attain proper positioning and proper leveling, said hinged brace further comprising a first leg slidably connected to a second leg, allowing the length of said hinged brace to be adjusted, said first leg being attached to the lower surface of said second tray component and said second leg of said hinged brace means having a T-shaped extension.

10. An adjustable, portable tool tray assembly for use in conjunction with a motor vehicle, wherein said tool tray assembly is supported by, and extends externally away from, said motor vehicle, said tool tray assembly comprising:

a tray having a first tray component having a generally planar surface and a second tray component, slidably connected to said first tray component, said second tray component having a generally planar surface parallel to said first tray component, and said second tray component and said first tray component together forming a single open tray compartment, wherein said first tray component and said second tray component further comprise a raised lip extending perpendicularly upwardly from each of said planar surfaces and along a portion of the perimeter of said first tray component and said second tray component and wherein said raised lip of said first tray component further comprises guide members to facilitate the retention of said second tray component over said first tray component;

a single point means for removable engagement with said motor vehicle at an edge structure of said motor vehicle, said means for removable engagement extending from said tray; and a hinged brace attached to said tray for positioning and for leveling said tool tray assembly on said motor vehicle, said brace engaging said motor vehicle at a horizontally extending structure of said motor vehicle, and said brace being slidably adjustable during engagement with said motor vehicle to attain proper positioning and proper leveling.

11. An adjustable, portable tool tray assembly for use in conjunction with a motor vehicle, wherein said tool tray assembly is supported by, and extends externally away from, said motor vehicle, said tool tray assembly comprising:

a tray having a first tray component having a generally planar surface and a second tray component, slidably connected to said first tray component, said second tray component having a generally planar surface parallel to said first tray component, and said second tray component and said first tray component together forming a single open tray compartment;

a single point means for removable engagement with said motor vehicle at an edge structure of said motor vehicle, said means for removable engagement extending from said tray;

a hinged brace attached to said tray for positioning and for leveling said tool tray assembly on said motor vehicle, said brace engaging said motor vehicle at a horizontally extending structure of said motor vehicle, and said brace being slidably adjustable during engagement with said motor vehicle to attain proper positioning and proper level;

wherein said first tray component and said second tray component further comprise a raised lip extending perpendicularly upwardly from each of said planar surfaces and along a portion of the perimeter of said first tray component and said second tray component; and wherein said raised lip of said first tray component further comprises guide members to facilitate the retention of said second tray component over said first tray component.

\* \* \* \* \*